Figure 1:
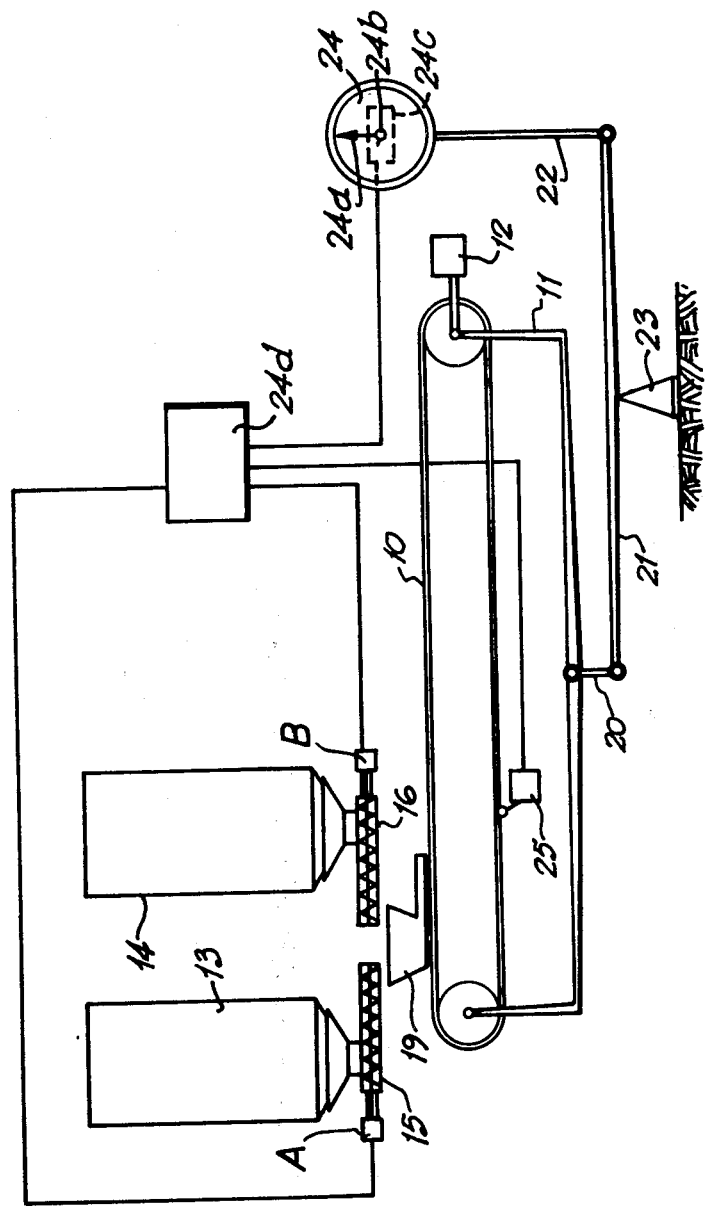

United States Patent [19]

Cook

[11] 4,202,466
[45] May 13, 1980

[54] METHOD OF AND APPARATUS FOR DISPENSING PREDETERMINED PROPORTIONS OF TWO OR MORE MATERIALS

[75] Inventor: Kenneth Cook, Stockport, England

[73] Assignee: Henry Simon Limited, Stockport, England

[21] Appl. No.: 652,047

[22] Filed: Jan. 26, 1976

Related U.S. Application Data

[63] Continuation-in-part of Ser. No. 485,945, Jul. 3, 1974, abandoned.

[30] Foreign Application Priority Data

Jul. 19, 1973 [GB] United Kingdom ............... 34336/73

[51] Int. Cl.² ............................................ G01G 19/22
[52] U.S. Cl. ........................................ 222/1; 222/55; 222/135; 177/70
[58] Field of Search ................. 222/1, 55, 56, 57, 135, 222/136; 177/70

[56] References Cited

U.S. PATENT DOCUMENTS

| | | | |
|---|---|---|---|
| 2,631,827 | 3/1953 | Saxe | 222/56 X |
| 2,921,712 | 1/1960 | Dickerson | 222/55 |
| 2,980,291 | 4/1961 | Schuerger | 222/57 X |

Primary Examiner—Robert J. Spar
Assistant Examiner—Frederick R. Handren
Attorney, Agent, or Firm—Norris & Bateman

[57] ABSTRACT

A method of and apparatus for dispensing pre-determined proportions of two or more different materials from supplies thereof, comprising the steps of dispensing one of the materials onto a moving conveyor band adapted gravimetrically to sense the rate of supply of that material, and when the required rate is sensed as by a strain gauge, dispensing a second material onto the band and sensing the rate of supply of the second material until the required rate is established, continuing the foregoing procedure until all of the materials are being dispensed in accordance with the desired pre-determined proportions and thereafter continuously or intermittently monitoring the composite supply, and in the event of a variation therein, arresting the supply of materials one or more at a time until the source of variation has been detected and corrected, the supply of materials then being continued.

7 Claims, 2 Drawing Figures

METHOD OF AND APPARATUS FOR DISPENSING PREDETERMINED PROPORTIONS OF TWO OR MORE MATERIALS

This is a continuation-in-part of Ser. No. 485,945 filed July 3, 1974, now abandoned.

This invention concerns a method of and apparatus for feeding pre-selected proportions of a plurality of materials from supplies thereof to a delivery point and continuously or intermittently monitoring said proportions.

In the supply of, for example, flour it is often necessary to include within a particular batch thereof two or more ingredients being, for example, different grades of flour evolved from different kinds of wheat and in such cases it is important to determine precise proportions of said ingredients.

It is therefore an object of the present invention to provide a method of and apparatus for dispensing preferably automatically the required amounts of two or more different materials from supplies thereof whilst ensuring that the proportions remain constant during delivery.

Thus according to the present invention, there is provided a method of dispensing at least two different materials in pre-determined proportions in composite supply comprising the steps of dispensing one of said materials while gravimetrically sensing the rate of supply of said material, automatically establishing a steady rate of supply of said material corresponding to the required predetermined proportion of that material, subsequently dispensing another of said materials to join said material already being dispensed while gravimetrically sensing the rate of combined supply of said materials, automatically establishing said combined supply at a steady rate whereby said materials are being dispensed in accordance with the required pre-determined proportions thereof, continuing said procedure if further materials are to be included until all of the materials are being dispensed in the required predetermined proportions in composite supply, thereafter monitoring said composite supply and, in the event of a variation in said composite supply in excess of specified tolerances, automatically arresting dispensing of at least one of said materials in order to discover the source of said variation and correcting same to re-establish said pre-determined proportions in the composite supply.

There is further provided, according to the invention, apparatus for carrying out the method aforesaid.

Figure 2:
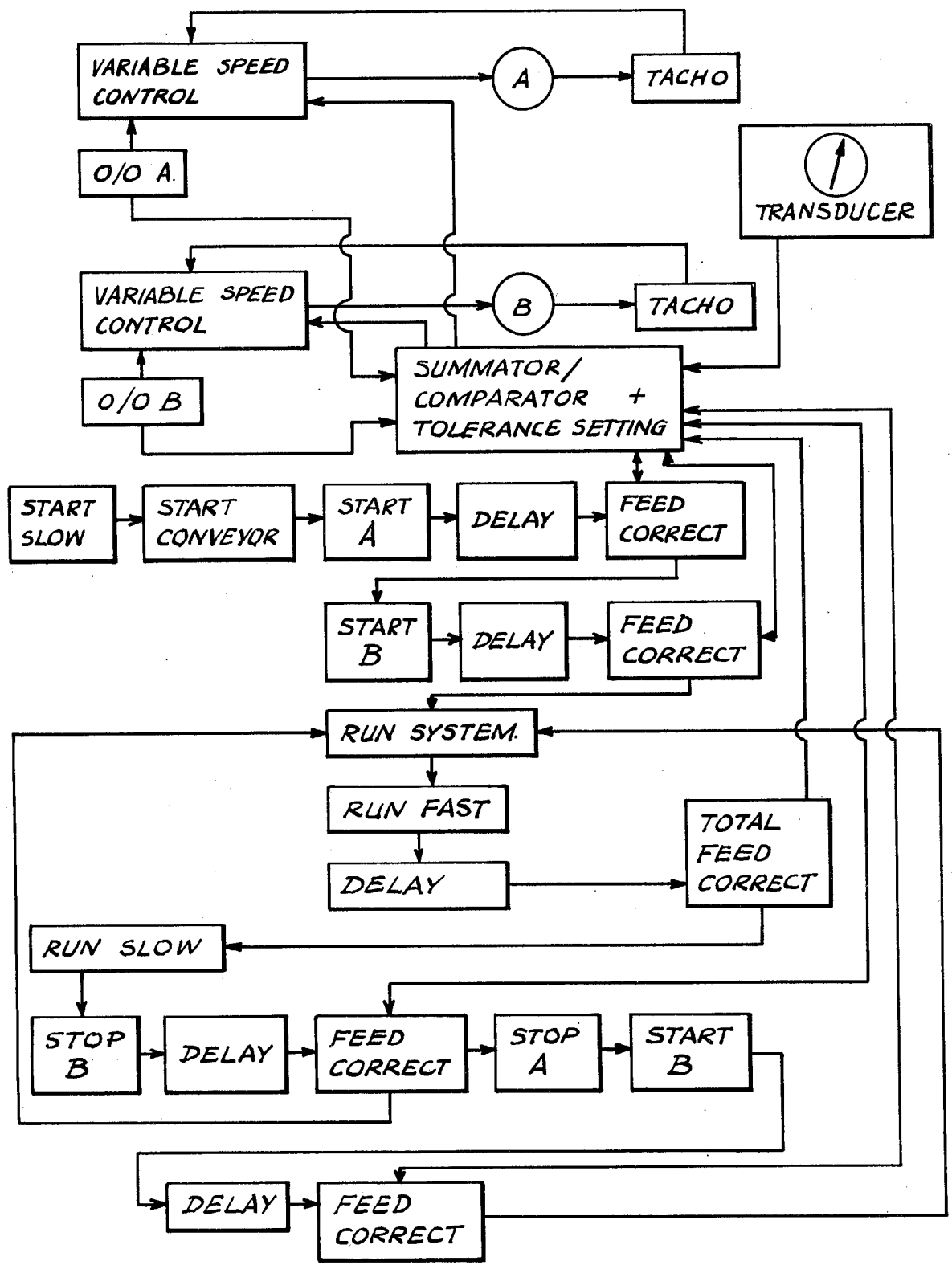

An embodiment of the invention will now be described, by way of example only, with reference to the accompanying drawings in which:

FIG. 1 illustrates schematically one form of apparatus for carrying out the method in accordance with the invention; and FIG. 2 is a block diagram illustrating an assembly of labelled sequence control units for effecting said method.

The apparatus includes a continuous belt conveyor 10 mounted on a supporting frame 11 and driven by a D.C. electric motor 12. A number, in this case two, of storage bins or hoppers 13 and 14 having output feed screws 15 and 16 driven by D.C. electric motors A and B respectively are so disposed above the conveyor 10 that material fed from said bins is dispensed via a chute 19 onto the belt which transports material from left to right in the drawing.

The frame 11 is shown, for the purpose of schematic illustration, connected, via links 20, 21, 22 and a fulcrum 23, to a strain gauge or like measuring instrument 24 which at any selected time thus weighs the material on the belt 10, and thus senses gravimetrically the rate of supply thereof.

The gauge 24 has a pointer 24a whose spindle 24b is drivingly coupled to a potentiometer 24c which is arranged via a suitable control system 24d to control operation of the output feed screws 15 and 16 of the bins 13 and 14, and thus the rates of feed can be established according to predetermined proportions as will be described.

A timing device 25 in contact with the belt 10 is adapted to sense the speed of movement of the latter for a purpose to be described.

In use it may be required, for example, to dispense from the apparatus a flow of materials in proportions such that 40% of the total issues from the bin 13, the remaining 60% coming from the bin 14. The sequence of operation for setting up and running the system will now be described with reference to FIG. 2 which represents the control system 24d and illustrates a plurality of interconnected labelled units, denoted by their functions respectively and comprising relays, solid state sequence controllers or sequence components switched by computer control.

The system illustrated in FIG. 2 comprises principally a unit which serves as a summator and comparator and which also has built into it the ability to operate within permitted tolerances. Connected to this unit, which for the sake of simplicity will be referred to as the COMPARATOR, are VARIABLE SPEED CONTROLS for the feeder motors which in this case are denoted A and B respectively and units denoted %A and %B which can be preset by an operator to determine the proportions of total feed to be delivered. The COMPARATOR is also connected to a TRANSDUCER which has already been referred to as the potentiometer 24c, and a number of control circuits one for each feeder motor. The COMPARATOR is further connected to a circuit for sequential checking for errors in delivery from the feeders upon recognition of an overall error in the total feed as will be described.

In order to set up the apparatus for feeding, for example 40 percent and 60 percent respectively of the materials from the bins 13 and 14, the units denoted %A and %B are set to 40 percent and 60 percent respectively by the operator who subsequently initiates the sequence by energising the START-SLOW unit. This in turn actuates the START-CONVEYOR unit, and the conveyor runs at a speed considerably less than its normal working speed. When the conveyor has been started a signal is automatically fed to the START-A unit and after a period of delay, determined by the timer 25 and the associated DELAY unit, sufficient to enable the conveying run of the belt 10 to be filled, a signal is fed from an associated FEED-CORRECT unit to initiate a comparison in the COMPARATOR between the signal being received from the TRANSDUCER or potentiometer 24c, and that preset in the %A unit. If the two signals balance which indicates that the material is being fed at the correct rate from the bin 13, then a signal is fed to the START-B unit to commence feed from the bin 14. If however, the signals do not balance thus the feed from the bin 13 is different from that required, then a signal is fed from the COMPARATOR to the VARIABLE SPEED CONTROL for feeder motor A to adjust same. It will be seen that motors A and B have tachometers which respectively are connected to the VARIABLE SPEED CONTROL for the individual motors.

Thus, when the feed from the bin 13 has been established at the required rate, a signal is fed to the START-B unit, and after a period of delay determined by the timer 25 and the associated DELAY unit sufficient to enable the conveying run of the belt 10 to be filled, a signal is again fed from the associated FEED-CORRECT unit to the COMPARATOR where a signal representing the composite feed from bins 13 and 14 is compared with the sum of the preset signals from the %A and %B units. If the signals balance, which indicates that both materials collectively amount to the total feed rate, then a signal is fed to a RUN-SYSTEM indicating unit and in turn to a RUN-FAST unit to speed up the motors A and B and the conveyor 10 so that the whole system is operating at normal running speed. After a further period of delay determined by the timer 25 and a further DELAY unit, a signal is fed to the COMPARATOR by the TOTAL-FEED-CORRECT unit so that the composite feed signal from the potentiometer 24c is again compared with the total preset signals from the %A and %B units.

This comparison is effected continuously or periodically to monitor that the total supply of materials from the bins 13 and 14 does not vary beyond the permitted tolerance built into the COMPARATOR. Should there be a variance of this kind, then, after a signal is fed to a RUN-SLOW unit to reduce the operative speed of the whole system, a correction sequence, as will now be described, is initiated.

For correction therefor, a signal is first fed to a STOP-B unit so that the motor B and feed from bin 13 are arrested, and after a period of delay determined by the timer 25, and an associated DELAY unit, a FEED-CORRECT unit transmits a signal to the COMPARATOR to compare the remaining TRANSDUCER signal with the preset signal associated with the still operative motor A. If there is no output from the COMPARATOR, which indicates that the unarrested part of the system is operating correctly and that the error detected by the TOTAL-FEED-CORRECT unit is present in the feed from the bin 14, then a signal is fed from the COMPARATOR to the VARIABLE SPEED CONTROL of motor B to rectify this error. When this has been done, a signal is again fed to the RUN-SYSTEM and RUN-FAST units to recommence the total feed. If, whilst motor B is stopped the COMPARATOR still senses an error between the TRANSDUCER signal and the remaining %A unit then a signal is fed to a STOP-A unit and in turn to a START-B unit and after a period of delay, a further FEED-CORRECT unit transmits a signal to the COMPARATOR to compare the transducer signal with that from the %B unit. If there is no output from the COMPARATOR which indicates that the then unarrested part of the system is operating correctly and that the error detected by the TOTAL-FEED-CORRECT unit is present in the feed from the bin 13, then a signal is fed from the COMPARATOR to the VARIABLE-FEED-CONTROL of motor A to rectify the error. Again, a signal is then fed to the RUN-SYSTEM and RUN-FAST units to recommence the total feed.

It will be appreciated that if more than two feeders are controlled by this system, the start-up and correction sequences are simply extended accordingly to ensure that each feeder is set to deliver a steady rate of supply as required and that said rate is maintained.

As an alternative method of correcting an error sensed in the composite feed, a signal can be supplied to arrest both or all of the feeders and, after a period of delay such that the belt 10 is emptied, the set-up sequence referred to above is commenced once again thus establishing the correct feed rate or rates from the feeders.

What is claimed is:

1. A method of dispensing at least two different materials in predetermined proportions in composite supply comprising the steps of dispensing one of said materials while gravimetrically sensing the rate of supply of said material, automatically establishing a steady rate of supply of said material corresponding to the required predetermined proportion of that material, subsequently dispensing another of said materials to join said material already being dispensed while gravimetrically sensing the rate of combined supply of said materials, automatically establishing said combined supply at a steady rate whereby said materials are being dispensed in accordance with the required predetermined proportions thereof, continuing said procedure if further materials are to be included until all of the materials are being dispensed in the required predetermined proportions in composite supply, the foregoing steps being carried out at reduced speed until dispensing of the composite supply in the required proportions is attained, and then the speed of dispensing of all materials being increased while maintaining said proportions, thereafter monitoring said composite supply and, in the event of a variation in said composite supply in excess of specified tolerances, automatically arresting dispensing of at least one of said materials in order to discover the source of said variation and correcting same to re-establish said predetermined proportions in the composite supply.

2. The method defined in claim 1, wherein said materials are continually conveyed and weighed during the sensing operations.

3. The method defined in claim 1, wherein speed of dispensing of the composite supply is reduced when said variation is being corrected.

4. A method according to claim 1, wherein in the event of a variation in said composite supply in excess of specified tolerances, dispensing of said materials is arrested one at a time, and the remaining combined supply gravimetrically sensed, until the source of variation has been discovered.

5. A method according to claim 1, wherein in the event of a variation in said composite supply in excess of specified tolerances, the dispensing of all of said materials is arrested simultaneously and restarted one at a time to re-establish said predetermined proportions in the composite supply.

6. A method of dispensing at least two different materials in predetermined proportions in composite supply comprising the steps of dispensing one of said materials while gravimetrically sensing the rate of supply of said material, automatically establishing a steady rate of supply of said material corresponding to the required predetermined proportion of that material, subsequently dispensing another of said materials to join said material already being dispensed while gravimetrically sensing the rate of combined supply of said materials, automatically establishing said combined supply at a steady rate whereby said materials are being dispensed in accordance with the required predetermined proportions thereof, continuing said procedure if further materials are to be included until all of the materials are being dispensed in the required predetermined proportions in composite supply, thereafter monitoring said composite supply and, in the event of a variation in said composite supply in excess of specified tolerances, automatically arresting dispensing of said materials one at a time while the remaining combined supply is gravimetrically sensed until the source of variation is discovered and correcting the variation to re-establish said predetermined proportions in the composite supply.

7. A method of dispensing at least two different materials in predetermined proportions in composite supply comprising the steps of dispensing one of said materials while gravimetrically sensing the rate of supply of said material, automatically establishing a steady rate of supply of said material corresponding to the required predetermined proportion of that material, subsequently dispensing another of said materials to join said material already being dispensed while gravimetrically sensing the rate of combined supply of said materials, automatically establishing said combined supply at a steady rate whereby said materials are being dispensed in accordance with the required predetermined proportions thereof, continuing said procedure if further materials are to be included until all of the materials are being dispensed in the required predetermined proportions in composite supply, thereafter monitoring said composite supply and, in the event of a variation in said composite supply in excess of specified tolerances, automatically arresting dispensing of all of said materials simultaneously and restarting dispensing of said materials one at a time while gravimetrically sensing the rate of supply of said materials in order to discover the source of said variation and correcting same to re-establish said predetermined proportions in the composite supply.

* * * * *